US011555269B2

(12) United States Patent
Li et al.

(10) Patent No.: US 11,555,269 B2
(45) Date of Patent: Jan. 17, 2023

(54) DUPLEX WASHING MACHINE WITH AUTOMATICALLY OPENABLE DRAWER

(71) Applicants: CHONGQING HAIER WASHING MACHINE CO., LTD., Chongqing (CN); HAIER SMART HOME CO., LTD., Shandong (CN)

(72) Inventors: Wenwei Li, Shandong (CN); Shaolei Yi, Shandong (CN); Yongshun Hou, Shandong (CN)

(73) Assignees: CHONGQING HAIER WASHING MACHINE CO., LTD., Chongqing (CN); HAIER SMART HOME CO., LTD., Shandong (CN)

( * ) Notice: Subject to any disclaimer, the term of this patent is extended or adjusted under 35 U.S.C. 154(b) by 215 days.

(21) Appl. No.: 16/960,797

(22) PCT Filed: Dec. 27, 2018

(86) PCT No.: PCT/CN2018/124216
§ 371 (c)(1),
(2) Date: Jul. 8, 2020

(87) PCT Pub. No.: WO2019/134577
PCT Pub. Date: Jul. 11, 2019

(65) Prior Publication Data
US 2021/0062399 A1    Mar. 4, 2021

(30) Foreign Application Priority Data

Jan. 8, 2018    (CN) .......................... 201810015239.4

(51) Int. Cl.
*D06F 39/14*    (2006.01)
*D06F 34/04*    (2020.01)
(Continued)

(52) U.S. Cl.
CPC .............. *D06F 39/14* (2013.01); *D06F 23/02* (2013.01); *D06F 34/04* (2020.02); *D06F 37/30* (2013.01);
(Continued)

(58) Field of Classification Search
None
See application file for complete search history.

(56) References Cited

U.S. PATENT DOCUMENTS

| 4,426,794 A | 1/1984 | Vanderheijden |
| 2007/0249212 A1 | 10/2007 | Buecker et al. |

(Continued)

FOREIGN PATENT DOCUMENTS

| CN | 205002509 U | 1/2016 |
| CN | 106222942 A | 12/2016 |

(Continued)

OTHER PUBLICATIONS

International Search Report (PCT/ISA/210) dated Apr. 2, 2019, by the Chinese Patent Office as the International Searching Authority for International Application No. PCT/CN2018/124216.

(Continued)

*Primary Examiner* — Cristi J Tate-Sims
(74) *Attorney, Agent, or Firm* — Buchanan Ingersoll & Rooney PC

(57) ABSTRACT

A duplex washing machine with an automatically openable drawer comprises a base, a drawer, and an automatic ejection device. The drawer is positioned in a housing of the washing machine; an opening through which the drawer is pulled and pushed to be opened and closed is formed in the housing; the automatic ejection device is arranged under the drawer and comprises a device body and a telescopic rod; an extension end of the telescopic rod is fixed with the drawer; the other end of the telescopic rod extends into the device (Continued)

body; the device body is fixedly connected to the base of the washing machine; and the device body drives the drawer to move into or out of the housing through the telescopic rod. According to the duplex washing machine, a user can open or close the drawer through one-click operation, such as simply pressing a button or touching.

14 Claims, 6 Drawing Sheets

(51) Int. Cl.
*D06F 23/02* (2006.01)
*D06F 37/30* (2020.01)
*A47B 88/457* (2017.01)
*D06F 39/12* (2006.01)
*F16H 19/04* (2006.01)
*D06F 31/00* (2006.01)

(52) U.S. Cl.
CPC ............ *A47B 88/457* (2017.01); *D06F 31/00* (2013.01); *D06F 39/12* (2013.01); *F16H 19/04* (2013.01)

(56) References Cited

U.S. PATENT DOCUMENTS

| | | | |
|---|---|---|---|
| 2009/0145177 | A1 | 6/2009 | Kim et al. |
| 2009/0160297 | A1* | 6/2009 | Anikhindi ............. F25D 25/025 312/319.7 |
| 2017/0002504 | A1* | 1/2017 | Jung ....................... D06F 37/02 |

FOREIGN PATENT DOCUMENTS

| | | |
|---|---|---|
| CN | 206109748 U | 4/2017 |
| CN | 108252030 A | 7/2018 |
| EP | 1205591 A2 | 5/2002 |
| EP | 3112515 A1 | 1/2017 |

OTHER PUBLICATIONS

Written Opinion (PCT/ISA/237) dated Apr. 2, 2019, by the Chinese Patent Office as the International Searching Authority for International Application No. PCT/CN2018/124216.
CN Office Action issued in CN Application No. 201810015239; dated Dec. 23, 2020. 10 Pages (with Translation).
European Search Opinion issued in EP Application No. 18898101.3; dated Feb. 8, 2021; 4 pages.
JP Notice of Reasons for Refusal issued in JP Application No. 2020-537573; dated Jan. 11, 2022 6 Pages (with Translation).

* cited by examiner

DUPLEX WASHING MACHINE WITH AUTOMATICALLY OPENABLE DRAWER

TECHNICAL FIELD

The present disclosure belongs to the technical field of washing machines, and in particular, relates to a duplex washing machine with an automatically openable drawer.

BACKGROUND

The duplex washing machine in the prior art includes drawers having diversified functions, to meet different requirements of customers, for example, a clothes washing machine, a shoe washing machine, or the like needs to be arranged in the washing machine. To facilitate pushing/pulling of the drawer, the common practice on the market at present is to install a handle on a panel of a drawer of a duplex washing machine. In this case, when opening or closing the drawer, a user needs to pull or push the handle manually. If articles in the drawer are too heavy, it is difficult for the user to pull or push the handle. Especially, if the drawer is arranged at the lower part of the washing machine body, the user needs to squat down to fully open the drawer. Alternatively, the user can open or close a drawer by pulling a slide rail mounted between the drawer and a washing machine cavity. However, such drawer that is ejected by an external force usually has a short ejection stroke. Because the ejection stroke is proportional to a triggering force applied on the drawer, a longer ejection stroke requires correspondingly a greater triggering force. Therefore, the opening and closing operations of the drawer are time-consuming and laborious.

In view of this, the duplex washing machine with an automatically openable drawer of the present disclosure is presented.

SUMMARY

The technical problem to be solved by the present disclosure is to overcome the deficiencies of the prior art, and the present disclosure provides a duplex washing machine with an automatically openable drawer. An automatic ejection device is arranged outside the drawer and is fixed on a base of the washing machine. The drawer can be automatically opened or closed through a simple key pressing or touching operation.

To solve the foregoing technical problem, the basic concept of the technical solution adopted by the present disclosure is as follows.

A duplex washing machine with an automatically openable drawer includes a base, a drawer, and an automatic ejection device, wherein the base is configured to support the washing machine on a mounting plane; the drawer is positioned in a housing of the duplex washing machine; an opening through which the drawer is pulled and pushed to be opened and closed is formed in the housing; the automatic ejection device is arranged under the drawer and includes a device body and a telescopic rod; an extension end of the telescopic rod is fixed with the drawer; the other end of the telescopic rod extends into the device body; the device body is fixedly connected to the base of the washing machine; and the device body drives the drawer to move into or out of the housing through the telescopic rod.

The drawer is arranged above the base; a gap is reserved between the base and the bottom of the drawer, so that the gap between the base and the drawer forms a hollow mounting cavity; and the automatic ejection device is mounted in the mounting cavity and fixed with the base.

Preferably, fixing base plates are arranged on two opposite sides of the base and are parallel to a moving direction of the drawer; a front baffle at the lower part of the opening is arranged at the front side of the housing; the front ends of the two fixing base plates are fixedly connected to the front baffle; and an opening through which the telescopic rod penetrates is formed in the front baffle.

A horizontal bracket is arranged in the mounting cavity; the two sides of the horizontal bracket are fixedly connected to the two fixing base plates in a one-to-one corresponding manner; the top end of the horizontal bracket is lower than that of the front baffle; and the device body is mounted on the horizontal bracket.

Preferably, the horizontal bracket is of a horizontally arranged plate structure; the two ends of the plate structure are horizontal fixing parts that are fixedly connected to the fixing base plates on the corresponding sides respectively; the middle of the plate structure is a horizontal mounting part on which the device body is mounted; and the two ends of the horizontal mounting part are connected to the horizontal fixing parts on the corresponding sides through oblique parts that extend downwards obliquely.

Further preferably, the horizontal fixing parts are placed on the fixing base plates on the corresponding sides in an attaching manner and fixedly connected with the fixing base plates; and the device body is fixedly mounted on the upper side of the horizontal mounting part.

The telescopic rod of the automatic ejection device is parallel to the moving direction of the drawer; the extension end of the telescopic rod is fixedly connected with the drawer; and the other end of the telescopic rod penetrates into the mounting cavity through the opening in the front baffle of the base and extends into the device body.

A front panel is arranged on an side, capable of moving out of the housing, of the drawer; the front panel has a protruding part that protrudes and extends downwards; the projection of the protruding part in a pushing-pulling direction of the drawer at least covers the periphery of the front baffle, so that when the drawer is pulled into the housing, the protruding part completely covers the front baffle of the base; and the extension end of the telescopic rod is fixed on the rear end surface of the protruding part.

Preferably, a fixing member is fixedly mounted on the rear end surface of the protruding part; an insertion hole into which the extension end of the telescopic rod can be inserted is formed in the fixing member; and a stop rib that protrudes in a radial direction and that is larger than the diameter of the insertion hole is arranged at the extension end of the telescopic rod and is clamped between the fixing member and the protruding part so that the extension end of the telescopic rod is fixed with the front panel of the drawer.

Further preferably, the telescopic rod extends in the pushing-pulling direction of the drawer; the extension end of the telescopic rod is connected with the middle of the protruding part; the device body is correspondingly mounted on the upper end surface of the horizontal mounting part of the horizontal bracket in an attaching manner; a plurality of through holes are formed in the periphery of the device body; holes that are in one-to-one corresponding to the through holes are formed in the horizontal mounting part; and fastening bolts penetrate through the through holes in the device body and the holes in the horizontal mounting part so that the device body and the horizontal bracket are fixed together through the fastening bolts.

Preferably, the device body is mounted in the middle of the horizontal mounting part so that when the automatic ejection device drives the drawer to move out of the housing, the drawer is stressed uniformly.

Further preferably, each fastening bolt is sleeved with a rubber cushion; and the rubber cushion is clamped between the device body and the horizontal bracket.

The device body includes a slide rail, a transmission device, and a driving device, wherein an end, extending into the device body, of the telescopic rod is connected with the transmission device; and under the driving of the driving device, the transmission device drives the telescopic rod to move along the slide rail so that the telescopic rod drives the drawer to move out of or into the housing.

The driving device is a motor capable of bidirectional rotation; the transmission device includes a transmission gear set; the transmission gear set is mounted on an output shaft of the motor; and the motor drives the transmission gear set to move clockwise or counterclockwise.

A plurality of saw teeth are transversely formed at the end, extending into the device body, of the telescopic rod; the end, extending into the device body, of the telescopic rod is of a rack structure and is meshed with an output gear of the transmission gear set; an input gear of the transmission gear set drives the output gear to perform transmission; and the end, extending into the device body, of the telescopic rod and the transmission gear set together form a rack-and-pinion mechanism.

The motor capable of bidirectional rotation is connected with one end of a conducting wire; the other end of the conducting wire passes through the device body to be connected with a terminal; and the terminal is connected with a control system of the washing machine to receive a signal that triggers the motor to rotate clockwise or counterclockwise, thereby pushing or pulling the drawer.

Compared with the prior art, the duplex washing machine adopting the foregoing technical solution has the following beneficial effects.

As the automatic ejection device that can automatically open or close the drawer is additionally mounted outside the drawer, no handle needs to be arranged on the drawer so that a user can open or close the drawer through one-click operation, such as simply pressing a button or touching. Therefore, the operation is simple, and time and labor are saved.

The automatic ejection device is fixed on the base of the washing machine, processing is simple, and the drawer can be opened or closed stably and reliably.

The specific embodiments of the present disclosure will be further described in detail with reference to accompanying drawings.

BRIEF DESCRIPTION OF THE DRAWINGS

Being a part of the present disclosure, the accompanying drawings are used to provide a further understanding of the present disclosure. The schematic embodiments of the present disclosure and explanations thereof are used to explain the present disclosure, but do not constitute an improper limitation on the present disclosure. Apparently, the accompanying drawings in the following description show merely some embodiments, and those of ordinary skill in the art may derive other drawings from these accompanying drawings without creative efforts. In the accompanying drawing.

Figure 1:
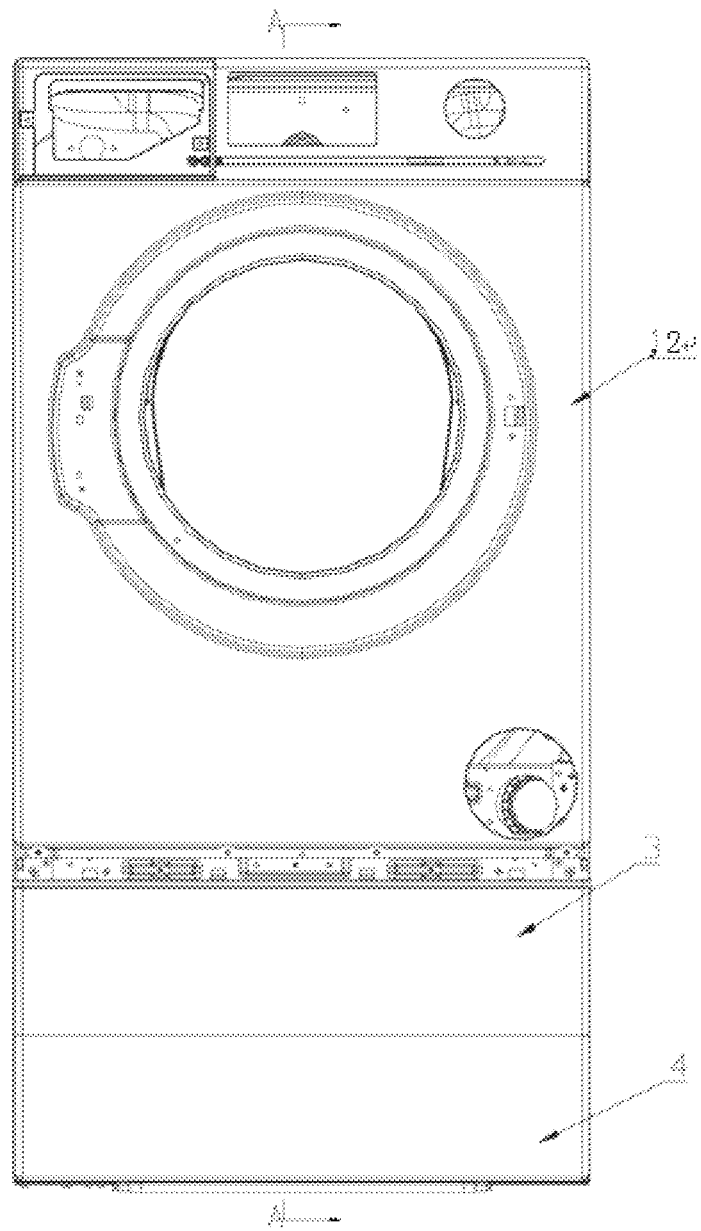
FIG. 1 is a front view of a duplex washing machine according to an embodiment of the present disclosure.

In the drawings: 1: First washing part; 2: Front end surface; 3: Drawer; 4: Front panel; 5: Drawer cavity; 6: Fixing base plate; 7: Front baffle; 8: Horizontal bracket; 9: Fastening bolt; 10: Base; 11: Screw; 12: Automatic ejection device; 13: Device body; 14: Telescopic rod; 15: Motor; 16: Input gear; 17: Output gear; 18: Transmission gear set; 19: Conducting wire; 20: Terminal; 21: Slide rail; 22: Through hole; 23: Horizontal fixing part; 24: Horizontal mounting part; 25: Oblique parts; 26: Extension end: 27: Mounting cavity; 28: Protruding part; 29: Fixing member; 30: Insertion hole.

It should be noted that these accompanying drawings and written descriptions are not intended in any way to limit the conception scope of the present disclosure, but intend to illustrate the concept of the present disclosure for those skilled in the art with reference to specific embodiments.

DETAILED DESCRIPTION

To make the objectives, technical solutions, and advantages of embodiments of the present disclosure clearer, the present disclosure will be clearly and completely described below with reference to the accompanying drawings in the embodiments of the present disclosure. The following embodiments are used to describe the present disclosure but not to limit the scope of the present disclosure.

Figure 2:
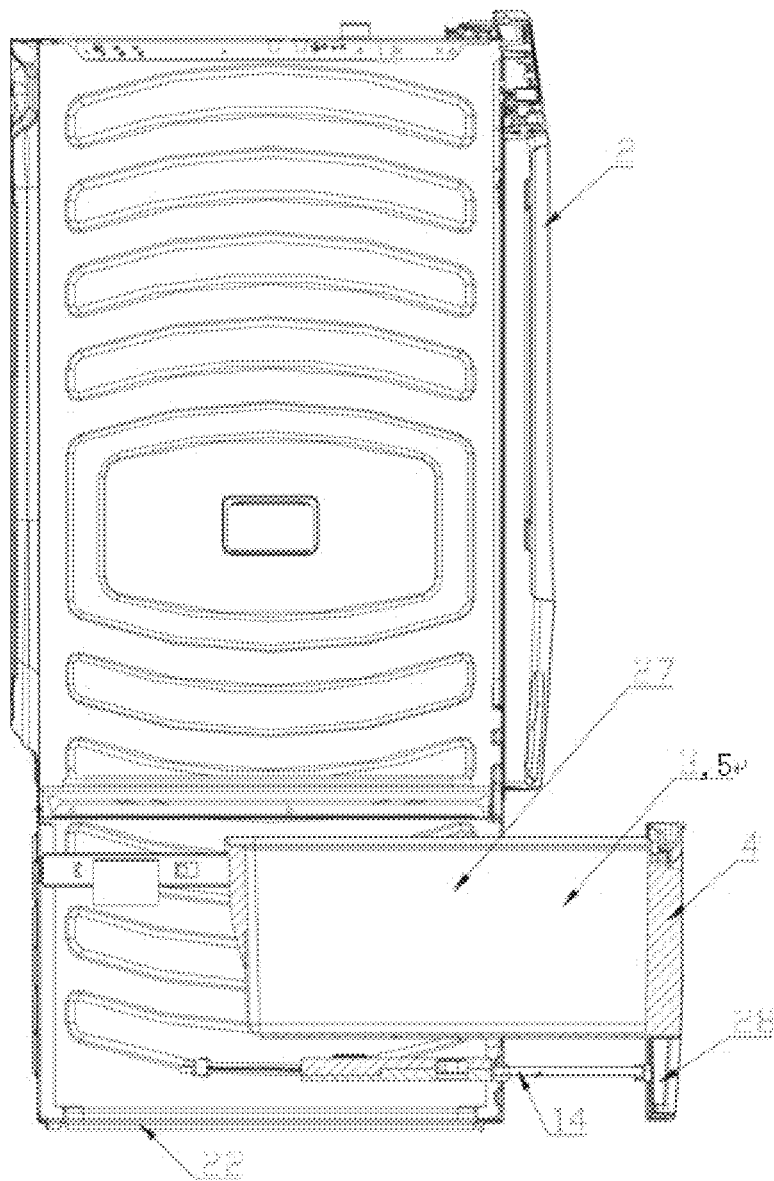
FIG. 2 is a section view of FIG. 1 in an A-A direction.
Figure 3:
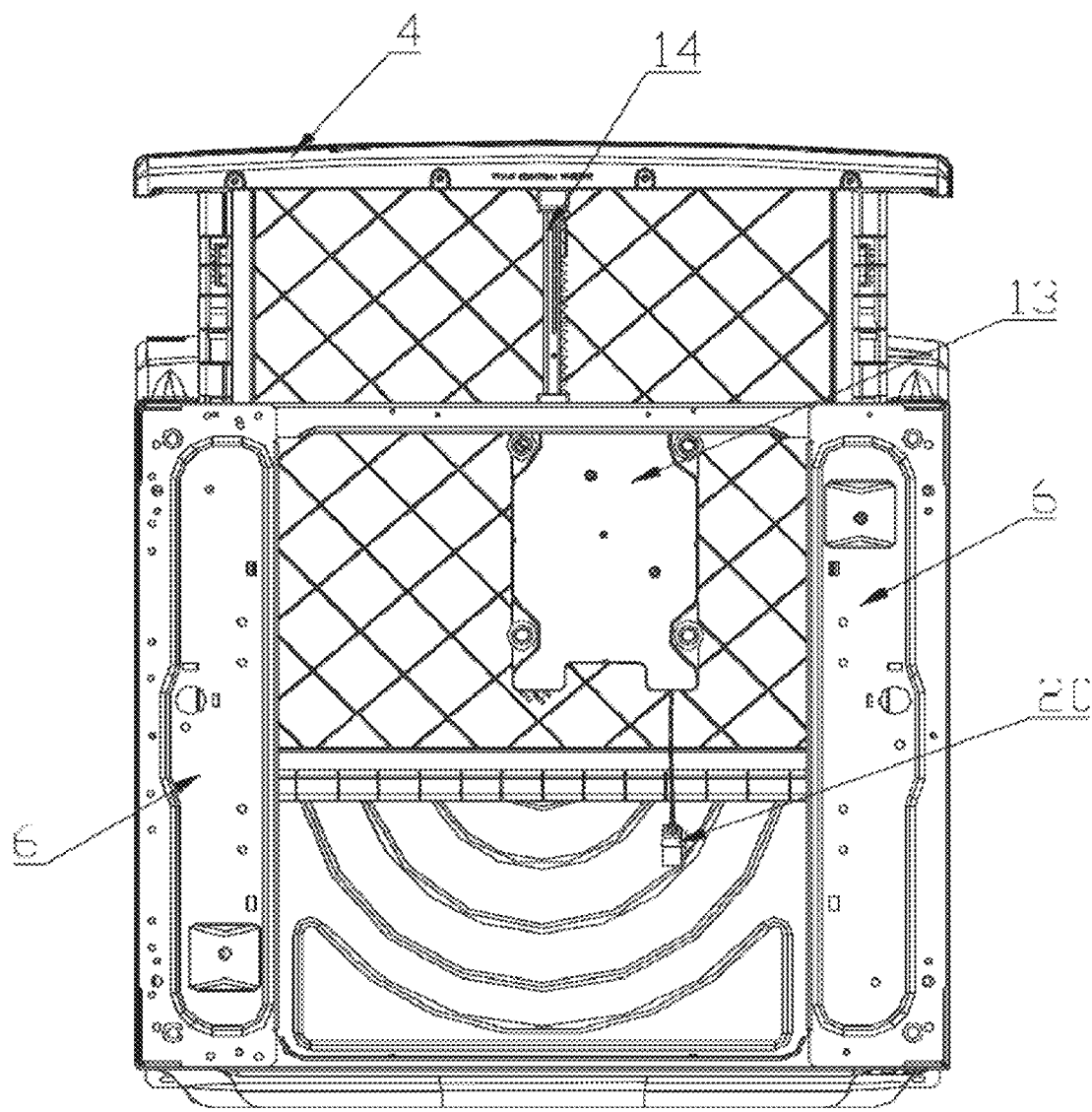
FIG. 3 is a bottom view of the duplex washing machine according to an embodiment of the present disclosure.

See FIG. 1 to FIG. 3, an embodiment of the present disclosure provides a duplex washing machine with an automatically openable drawer 3. The duplex washing machine includes a first washing part 1 and a second washing part that are arranged in a housing up and down integrally. A washing device driven by a driving device is arranged in the first washing part 1 and includes a washing barrel. An impeller or a rolling strip is mounted in the washing barrel. An accommodating space is reserved under the first washing part 1. An opening is formed in a front end surface 2, corresponding to the housing of the first washing part 1, of the housing of the space. The second washing part is arranged in the opening.

In the embodiment of the present disclosure, the second washing part includes a drawable drawer 3 and a base 10. A front panel 4 of the drawer 3 is corresponding to the opening of the housing, and is matched with the front end surface 2 of the housing of the first washing part 1, the entire washing machine looks as a whole from the outside, and the appearance is free of connection traces, so that the washing machine is beautiful. The base 10 is arranged under the drawer 3. The washing machine is supported on a mounting plane. The base 10 includes fixing base plates 6 arranged on the two sides. The fixing base plates 6 are arranged horizontally. The front end parts of the fixing base plates 6 are fixed with a vertically arranged front baffle 7 respectively. A horizontal bracket 8 is fixed on the fixing base plates 6.

Figure 4:
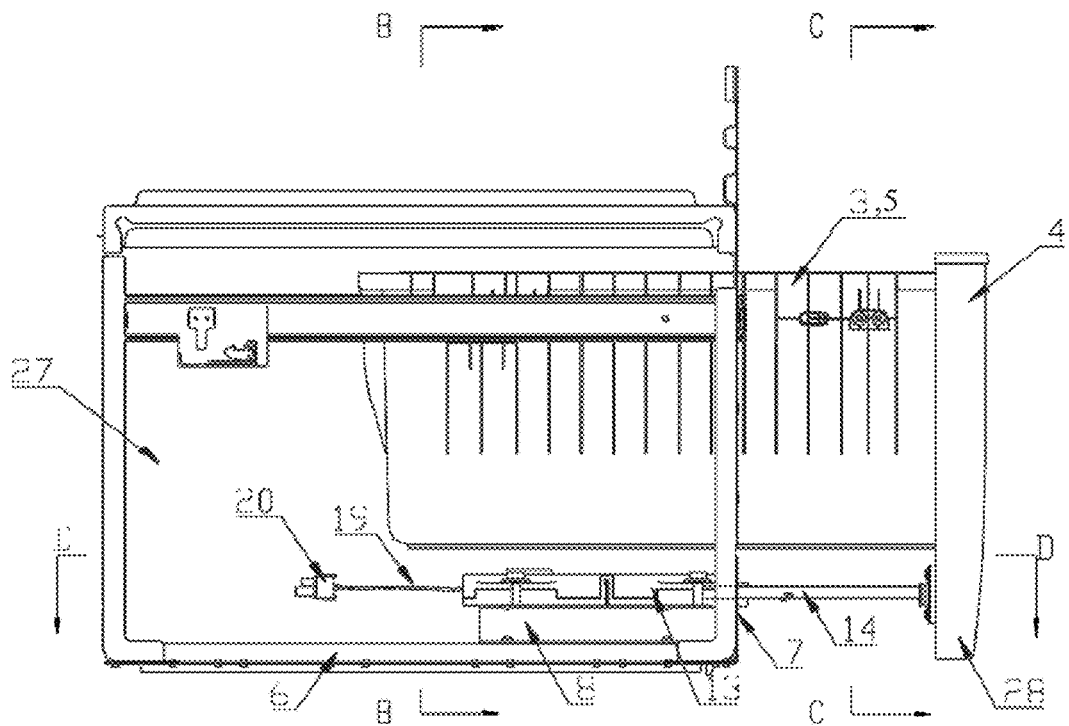
FIG. 4 is a schematic structural diagram of a drawer in an ejection state according to an embodiment of the present disclosure.
Figure 5:
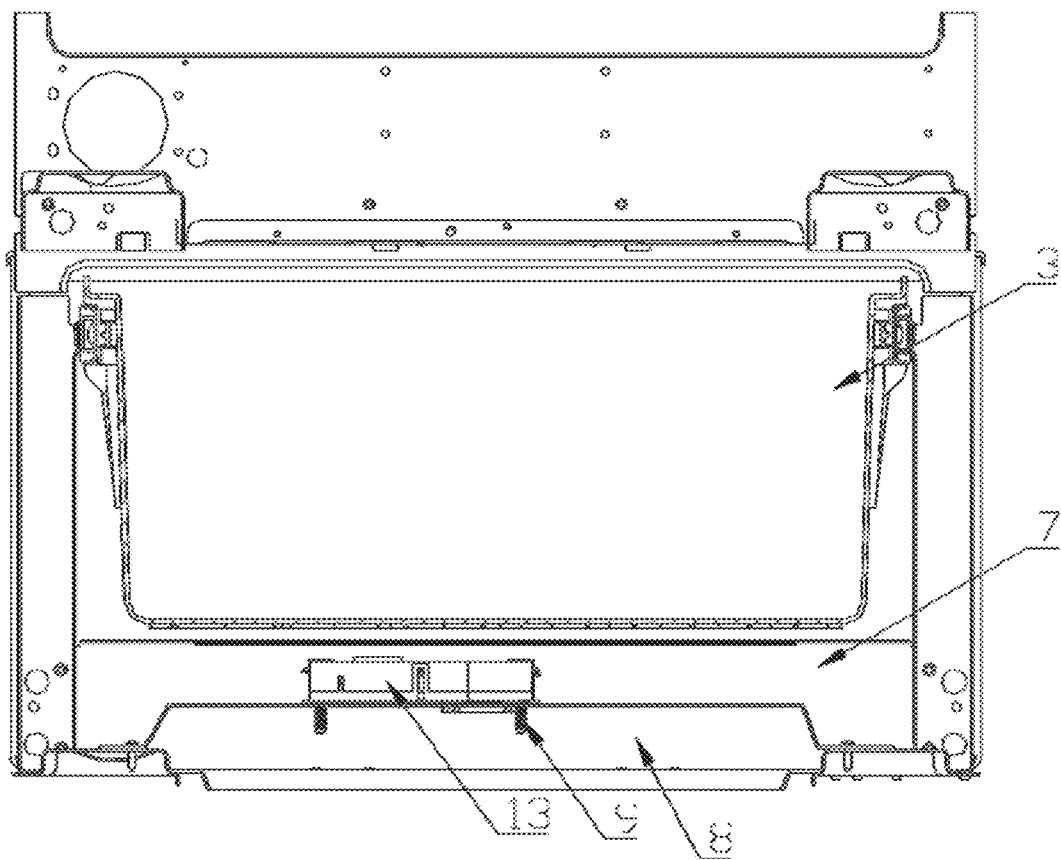
FIG. 5 is a section view of FIG. 4 in a B-B direction.
Figure 6:
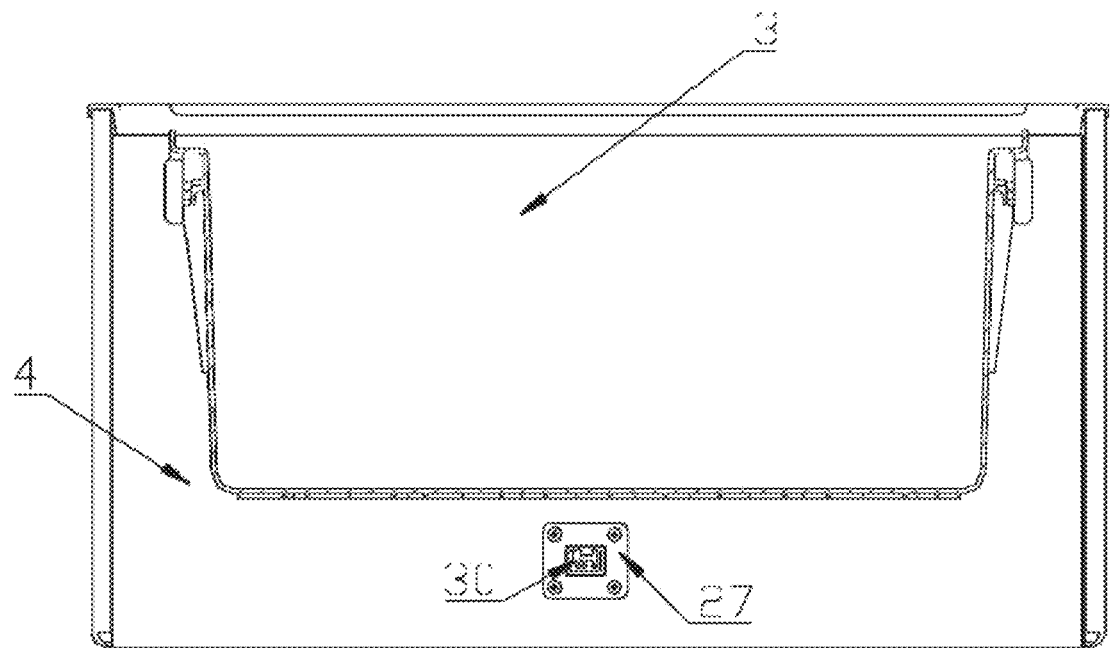
FIG. 6 is a section view of FIG. 4 in a C-C direction.
Figure 7:
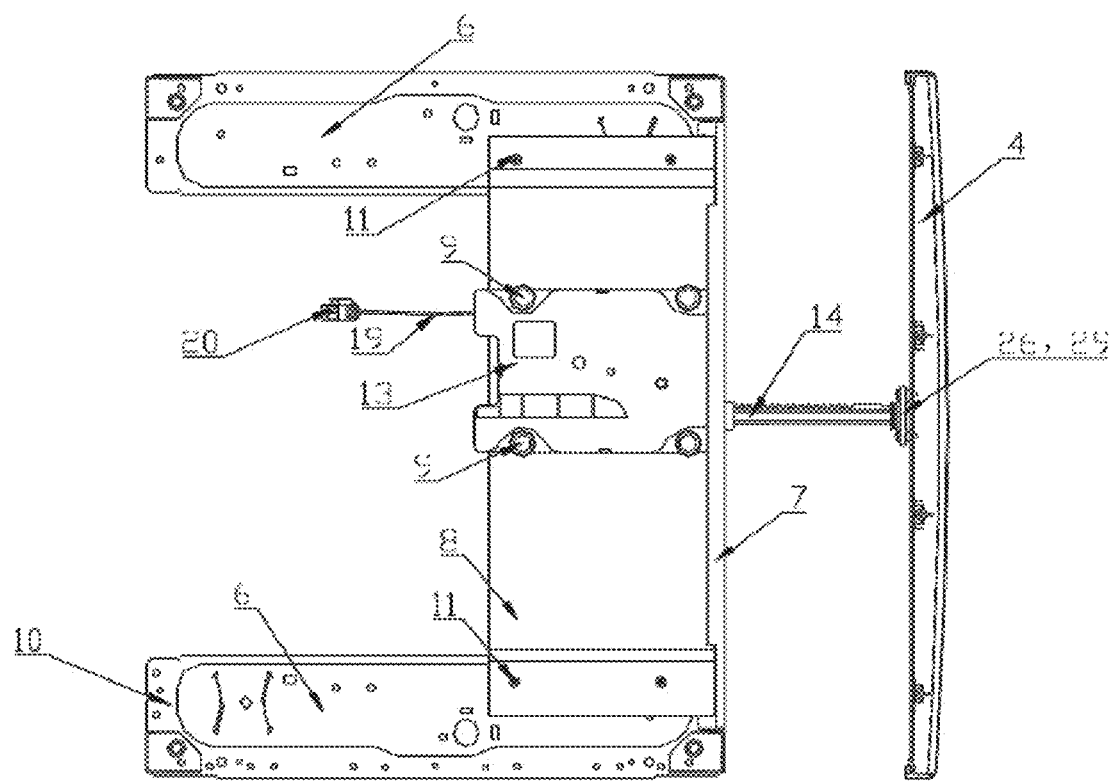
FIG. 7 is a section view of FIG. 4 in a D-D direction.

As shown in FIG. 4, in the embodiment of the present disclosure, the drawer 3 includes an open-top drawer cavity 5 and the front panel 4, wherein the front panel 4 is arranged vertically, and protrudes and extends downwards to form a protruding part 28 so that the front panel 4 protrudes out of the front baffle 7 of the base 10. When the drawer 3 is pulled back into the housing, the front panel 4 of the drawer 3 is on the same vertical plane as the front end surface 2 of the first washing part 1 and is attached to the front baffle 7 of the base 10.

In the embodiment of the present disclosure, an automatic ejection device 12 is arranged under the drawer 3. The automatic ejection device 12 drives the drawer 3 to move so that the drawer 3 can be opened and closed automatically.

In the embodiment of the present disclosure, the drawer 3 has diversified functions. Washing equipment used for washing clothes, or drying equipment used for drying clothes, storage equipment for accommodating a detergent, or the like can be installed in the drawer 3, thereby meeting diversified requirements of users.

In the embodiment of the present disclosure, a control system and a control panel that are used for controlling the automatic ejection device 12 are mounted on the housing of the washing machine. Control keys are arranged on the control panel. Therefore, a user can open and close the drawer 3 by performing a simple key pressing or touching operation on the control panel.

Embodiment 1

As shown in FIG. 4 to FIG. 7, an embodiment discloses an automatic ejection device 12. The automatic ejection device 12 is fixedly connected with the drawer 3 and the base 10, and includes a telescopic rod 14 and a device body 13. The device body 13 drives the telescopic rod 14 to stretch. The telescopic rod 14 is arranged horizontally, and is parallel to a moving direction of the drawer 3. An extension end 26 of the telescopic rod 14 is fixedly connected with the front panel 4 of the drawer 3. The other end of the telescopic rod 14 penetrates through the front baffle 7 of the base 10 and then extends into the device body 13.

Figure 8:
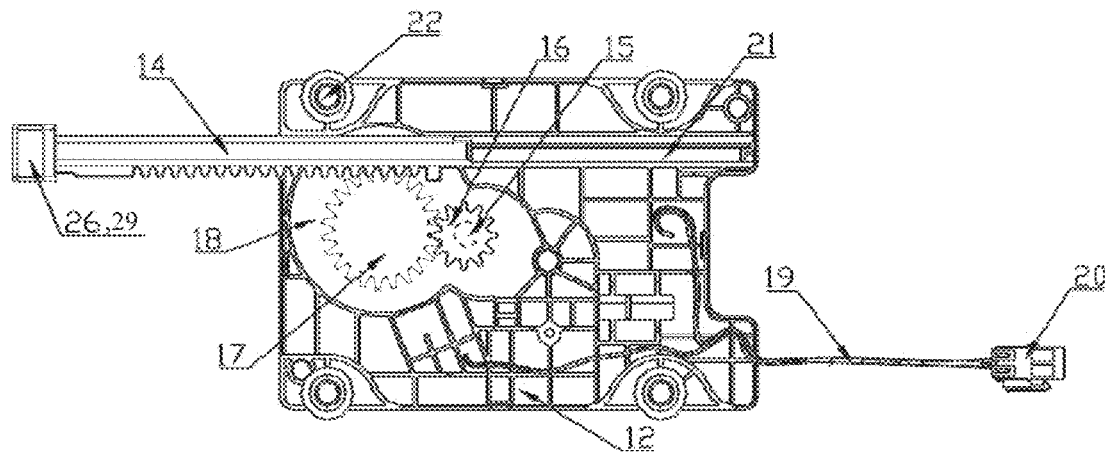
FIG. 8 is a schematic structural diagram of an automatic ejection device in an open state according to an embodiment of the present disclosure.
Figure 9:
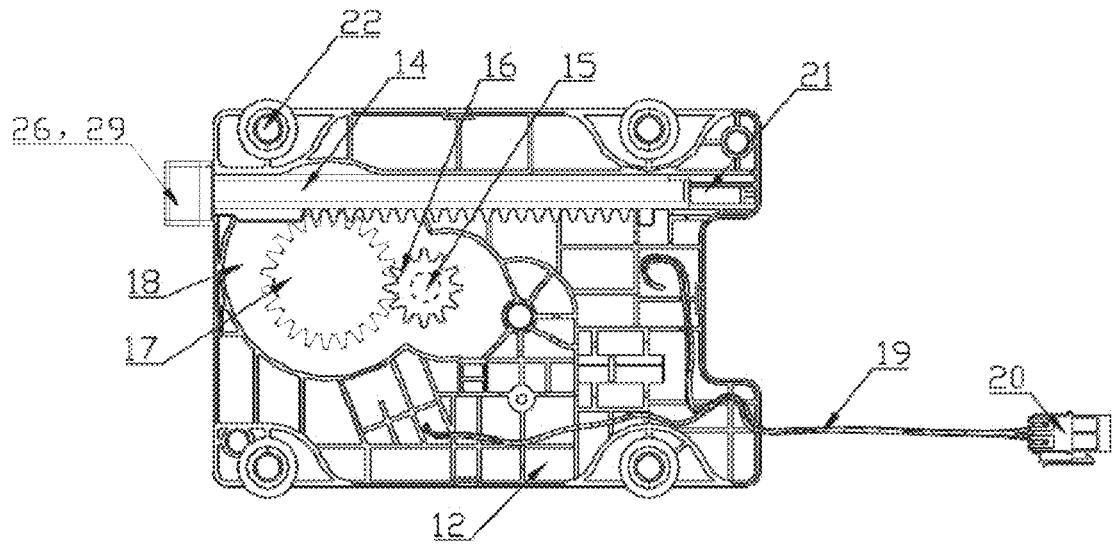
FIG. 9 is a schematic structural diagram of an automatic ejection device in a closed state according to an embodiment of the present disclosure.

As shown in FIG. 8 to FIG. 9, in the embodiment, the device body 13 includes a transmission device and a driving device. An end, extending into the device body 13, of the telescopic rod 14 is connected with the transmission device. Under the driving of the driving device, the transmission device drives the telescopic rod 14 to move, and then, the telescopic rod 14 drives the drawer 3 to move into or out of the housing.

In the embodiment, the driving device is a motor capable of bidirectional rotation. The transmission device includes a transmission gear set 18. The transmission gear set 18 is mounted on an output shaft of the motor. The motor drives the transmission gear set 18 to rotate clockwise or counterclockwise.

In the embodiment, a plurality of sawteeth are transversally formed in the end, extending into the device body 13, of the telescopic rod 14. The end, extending into the device body 13, of the telescopic rod 14 is of a rack structure and is meshed with an output gear 17 of the transmission gear set 18. An input gear 16 of the transmission gear set 18 drives the output gear 17 to perform transmission. The end, extending into the device body 13, of the telescopic rod 14 and the transmission gear set 18 together form a rack-and-pinion mechanism.

In the embodiment, the motor drives the transmission gear set 18 to rotate, and when rotating, the transmission gear set 18 drives the telescopic rod 14 matched with the transmission gear set 18 to move. Because the telescopic rod 14 is fixed on the front panel 4 of the drawer 3, the telescopic rod 14 moves to drive the drawer 3 to move, thereby automatically opening or closing the drawer 3. The drawer 3 can be opened or closed by controlling the motor to rotate clockwise or counterclockwise, so that opening or closing control of the drawer becomes simple and convenient. The transmission gear set 18 is matched with the telescopic rod 14, the structure is simple, and the moving stability of the drawer is improved effectively.

In the embodiment, to improve the automatic opening and closing smoothness of the drawer 3, a slide rail 21 parallel to the moving direction of the drawer 3 are arranged in the device body 13 of the automatic ejection device 12. The telescopic rod 14 is arranged on the slide rail 21. The transmission gear set 18 drives the telescopic rod 14 to move along the slide rail 21, thereby effectively improving the moving stability of the drawer 3.

Embodiment 2

As shown in FIG. 8 to FIG. 9, in the embodiment, the transmission gear set 18 includes the input gear 16 and the output gear 17. The input gear 16 of the transmission gear set 18 is mounted on the output shaft of the motor. The output gear 17 is coaxially connected with the input gear 16. When a rotation speed of the motor is inconsistent with a preset moving speed of the drawer 3, to ensure the automatic opening and closing stability of the drawer, the rotation speed of the motor is adjusted by the transmission gear set 18, then the transmission gear set 18 drives the telescopic rod 14 to move along the slide rail 21 at a proper rotation speed, and the telescopic rod 14 drives the drawer 3 to move so that the drawer 3 rotates at the preset moving speed.

According to a first specific implementation of the embodiment, the input gear 16 and the output gear 17 form a gear set in which the input gear 16 and the output gear 17 are meshed with each other. The diameter of the input gear 16 is smaller than that of the output gear 17.

According to a second specific implementation of the embodiment, both the input gear 16 and the output gear 17 are belt-driving gears. The input gear 16 drives the output gear 17 to rotate through a belt. The diameter of the input gear 16 is smaller than the output gear 17.

According to a third specific implementation of the embodiment, both the input gear 16 and the output gear 17 are chain-driving gears. The input gear 16 drives the output gear 17 to rotate through a chain. The diameter of the input gear 16 is smaller than that of the output gear 17.

As the diameter of the input gear 16 is smaller than that of the output gear 17, it is effectively ensured that when the rotation speed of the motor is relatively fast, the transmission gear set 18 can further perform a speed reduction function, so that the telescopic rod 14 can rotate at a speed lower than that of the motor, and drives the drawer 3 to move at a relatively low speed, thereby ensuring that the drawer 3 is opened or closed at a preset speed.

When the rotation speed of the motor is relatively slow, it can be designed that the diameter of the input gear 16 is larger than that of the output gear 17. In this case, the transmission gear set 18 performs a speed increase function, so that the telescopic rod 14 can rotate at a speed faster than that of the motor and drives the drawer 3 to move at a relatively fast speed, thereby ensuring that the drawer 3 is opened or closed at a preset speed.

Embodiment 3

As shown in FIG. 8 to FIG. 9, in the embodiment, the driving motor of the automatic ejection device 12 is connected with one end of a conducting wire 19, and the other end of the conducting wire 19 passes through the device body 13 to be connected with a terminal 20. The terminal 20 is connected with a control system of the housing and is configured to receive signals triggering the motor to rotate clockwise or counterclockwise.

As shown in FIG. 8, in the embodiment, when needing to open the drawer 3, a user presses down an open button on the control panel of the housing, and then the control system sends a signal triggering the motor to rotate clockwise to the terminal 20. After receiving the signal triggering the motor to rotate clockwise, the motor drives the input gear 16 to rotate clockwise, the output gear 17 is driven to rotate counterclockwise, and the telescopic rod 14 is driven to move forwards along the slide rail 21, thereby pushing the drawer to move forwards. As a result, the drawer 3 is opened automatically.

As shown in FIG. 9, in the embodiment, when needing to closing the drawer 3, the user presses down a close button on the control panel of the housing, and then the control system sends a signal triggering the motor to rotate counterclockwise to the terminal 20. After receiving the signal triggering the motor to rotate counterclockwise, the motor drives the input gear 16 to rotate counterclockwise, the output gear 17 is driven to rotate clockwise, and the telescopic rod 14 is driven to move backwards along the slide rail 21, thereby pulling the drawer to move backwards. As a result, the drawer 3 is closed automatically.

Embodiment 4

As shown in FIG. 4 to FIG. 7, in the embodiment, the base 10 is arranged under the drawer 3, and a gap is reserved between the base 10 and the bottom of the drawer 3 so that the gap between the base 10 and the drawer 3 forms a hollow mounting cavity 27. The automatic ejection device 12 is mounted in the mounting cavity 27.

In the embodiment, fixing base plates 6 are horizontally arranged on two opposite sides of the base 10 and are parallel to the moving direction of the drawer 3. A front baffle 7 located at the lower part of the opening is arranged at the front side of the housing. The front ends of the fixing base plate 6 are fixed to the front baffle 7. The front baffle 7 is vertically arranged on a pushing-pulling side of the drawer and is corresponding to the front end surface 2 of the housing of the first washing part 1. The top end of the front baffle 7 is lower than the bottom end of the drawer cavity 5 of the drawer 3 and is higher than the bottom end of the front panel 4 of the drawer 3. The bottom end of the front baffle 7 is flush with that of the front panel 4. When the drawer 3 is pulled into the housing, the front panel 4 of the drawer 3 is attached to the front baffle 7, and completely covers the front baffle 7 so that the front baffle 7 prevents the drawer 3 from moving further into the housing. An opening is formed in the front baffle 7 through which the telescopic rod 14 of the automatic ejection device 12 penetrates.

In the embodiment, a horizontal bracket 8 is mounted in the mounting cavity 27 defined by the base 10 and the drawer 3 and is fixed on the fixing base plates 6. The two sides of the horizontal bracket 8 are fixedly connected to the two fixing base plates 6 in a one-to-one corresponding manner. The horizontal bracket 8 is of a horizontally arranged plate structure. The two ends of the plate structure are horizontal fixing parts 23 that are connected to the fixing base plates 6 on the corresponding sides. The middle of the plate structure is a horizontal mounting part 24 on which the device body 13 is mounted. The two ends of the horizontal mounting part 24 are connected to the horizontal fixing parts 23 on the corresponding sides through oblique parts 25 that extend downwards obliquely.

Preferably, the horizontal fixing parts 23 are placed on the upper sides of the fixing base plates 6 on the corresponding sides in an attaching manner and fixedly connected with the fixing base plates 6 through screws 11. The device body 13 is fixedly mounted on the upper side of the horizontal mounting part 24.

In the embodiment, the horizontal mounting part 24 is higher than the horizontal fixing parts 23, so that a certain distance is reserved between the horizontal mounting part 24 and the bottom of the base 10, thereby preventing failure of the automatic ejection device 12 caused by such a phenomenon that the device body 13 on the horizontal mounting part 24 is immersed in water under the washing machine, and further ensuring that the automatic ejection device 12 can work normally. The horizontal mounting part 24 is lower than the top end of the front baffle 7 of the base 10, so that when the device body 13 of the automatic ejection device 12 is mounted on the horizontal bracket 8, the telescopic rod 14 cannot be higher than the top end of the front baffle 7, and the telescopic rod 14 can pass through the front baffle 7 to be fixed with the drawer 3.

Embodiment 5

In the embodiment, a front panel 4 is arranged at a side, capable of moving out of the housing, of the drawer 3. The front panel 4 has a protruding part 28 that protrudes and extends downwards. The projection of the protruding part 28 in the pushing-pulling direction of the drawer at least covers the periphery of the front baffle 7 so that when the drawer 3 is pulled into the housing, the protruding part 28 completely covers the front baffle 7 of the base.

In the embodiment, the telescopic rod 14 of the automatic ejection device 12 is parallel to the moving direction of the drawer 3. The extension end 26 of the telescopic rod 14 is fixedly connected with the drawer 3, and the other end of the telescopic rod 14 penetrates into the mounting cavity 27 through the opening in the front baffle 7 of the base 10, and extends into the device body 13.

In the embodiment, the extension end 26 of the telescopic rod 14 is fixed on the rear end surface of the protruding part 28. A fixing member 29 is fixedly mounted on the rear end surface of the protruding part 28. An insertion hole 30 into which the extension end 26 of the telescopic rod 14 is inserted is formed in the fixing member 29. The extension end 26 that is inserted into the insertion hole 30 is of an irregular shape, thereby preventing the telescopic rod 14 from being mounted inversely when fixed to the protruding part 28. A stop rib that protrudes in a radial direction and that is larger than the diameter of the insertion hole 30 is arranged at the extension end 26, and is clamped between the fixing member 29 and the protruding part 28 so that the extension end 26 of the telescopic rod 14 is fixed with the front panel 4 of the drawer 3.

Preferably, the telescopic rod 14 extends in the pushing-pulling direction of the drawer 3. The extension end 26 of the telescopic rod 14 is connected with the middle of the protruding part 28 so that the force on the drawer is uniform.

As shown in FIG. 4 to FIG. 7, in the embodiment, the device body 13 of the automatic ejection device 12 is correspondingly mounted on the upper end surface of the horizontal mounting part 24 of the horizontal bracket 8 in an attaching manner. The top end of the device body 13 is lower than the bottom end of the drawer cavity 5 of the drawer 3, thereby preventing the device body 13 from rubbing on the bottom of the drawer 3 when the automatic ejection device 12 runs, and further avoiding damage of the automatic ejection device 12 and the drawer 3. Through holes 22 are formed in the periphery of the device body 13. Holes that are in one-to-one corresponding to the through holes 22 are formed in the horizontal mounting part 24 of the horizontal bracket 8. Fastening bolts 9 penetrate through the through holes 22 in the device body 13 and the holes in the horizontal mounting part 24 so that the device body 13 is fixed with the horizontal bracket 8 through the fastening bolts 9.

Preferably, the device body 13 is fixed in the middle of the horizontal bracket 8. Therefore, when the automatic ejection device 12 works, the force applied on the drawer 3 by the telescopic rod 14 is balanced, and the drawer 3 moves outwards or inwards conveniently.

Preferably, a rubber cushion sleeves the end, near the horizontal bracket 8, of each fastening bolt 9. The rubber cushion is clamped between the horizontal bracket 8 and the device body 13. Therefore, the following phenomenon can be avoided: when working, the automatic ejection device 12 shakes under the impact of the driving motor or the moving of the telescopic rod 14, then the automatic ejection device 12 drives the horizontal bracket 8 and the base 10 to shake together, and finally, the housing shakes violently during work.

The aforementioned embodiments are merely preferred embodiments of the present disclosure, but do not constitute a limitation in any form to the present disclosure. Although the present disclosure is illustrated above by using the preferred embodiments, the preferred embodiments are not used to limit the present disclosure. Changes or modifications made, without departing from the scope of the technical solutions of the present disclosure, by those skilled in the art by using the aforementioned technical content are equivalently changed equivalent embodiments. Any simple changes, equivalent variations and modifications made to the aforementioned embodiments with reference to the technical essence of the present disclosure shall fall within the scope of the solutions of the present disclosure, provided that they do not depart from content of the technical solutions of the present disclosure.

The invention claimed is:

1. A duplex washing machine with an automatically openable drawer, comprising:
   a base being configured to support the washing machine on a mounting plane;
   a drawer, being positioned in a housing of the duplex washing machine, wherein the housing is provided with a first opening through which the drawer is pulled and pushed to be opened and closed; and
   an automatic ejection device, being arranged below the drawer, wherein the automatic ejection device comprises a device body and a telescopic rod, an extension end of the telescopic rod is fixed with the drawer, an other end of the telescopic rod extends into the device body, the device body is fixedly connected to the base of the washing machine, and the device body drives the drawer to move into or out of the housing through the telescopic rod;
   wherein the drawer is arranged above the base, a gap is reserved between the base and a bottom of the drawer, and the gap between the base and the drawer forms a mounting cavity, the automatic ejection device is mounted in the mounting cavity and fixed with the base; and
   a fixing base plate is arranged on each of two opposite sides of the base and the fixing base plates extend parallel to a moving direction of the drawer, a front baffle at a lower part of the first opening is arranged at a front side of the housing, a front end of each of two fixing base plates is connected to the front baffle, and a second opening through which the telescopic rod penetrates is formed in the front baffle;
   a horizontal bracket is arranged in the mounting cavity, two sides of the horizontal bracket are respectively connected to the two fixing base plates, a top end of the horizontal bracket is lower than a top end of the front baffle, and the device body is mounted on the horizontal bracket.

2. The duplex washing machine with the automatically openable drawer according to claim 1, wherein the telescopic rod of the automatic ejection device extends parallel to a moving direction of the drawer, the extension end of the telescopic rod is fixedly connected with the drawer, and the other end of the telescopic rod penetrates into the mounting cavity through the second opening in the front baffle of the base and extends into the device body.

3. The duplex washing machine with the automatically openable drawer according to claim 2, wherein a front panel is arranged on a side, capable of moving out of the housing, of the drawer,
   the front panel has a protruding part that protrudes and extends downwards,
   a projection of the protruding part in a pushing-pulling direction of the drawer at least covers a periphery of the front baffle, so that when the drawer is pulled into the housing, the protruding part completely covers the front baffle of the base;
   the extension end of the telescopic rod is fixed on a rear end surface of the protruding part.

4. The duplex washing machine with the automatically openable drawer according to claim 1, wherein the device body is correspondingly mounted on an upper end surface of a horizontal mounting part of the horizontal bracket, and a plurality of through holes are formed in a periphery of the device body;
   the horizontal mounting part is provided with holes that are in one-to-one correspondence to the through holes, and
   fastening bolts penetrate through the through holes in the device body and the holes in the horizontal mounting part so that the device body and the horizontal bracket are fixed together through the fastening bolts.

5. The duplex washing machine with the automatically openable drawer according to claim 1, wherein the device body comprises a slide rail, a transmission device, and a driving device, wherein the other end of the telescopic rod extends into the device body and is connected with the transmission device, and
   under a driving of the driving device, the transmission device drives the telescopic rod to move along the slide rail so that the telescopic rod drives the drawer to move out of or into the housing.

6. The duplex washing machine with the automatically openable drawer according to claim 5, wherein the driving device is a motor configured for bidirectional rotation, the transmission device comprises a transmission gear set, the transmission gear set is mounted on an output shaft of the motor, and the motor drives the transmission gear set to rotate clockwise or counterclockwise.

7. The duplex washing machine with the automatically openable drawer according to claim 6, wherein a plurality of gear teeth are transversely formed in the other end, extending into the device body, of the telescopic rod,
the other end, extending into the device body, of the telescopic rod is of a rack structure and is meshed with an output gear of the transmission gear set,
an input gear of the transmission gear set drives the output gear to perform transmission, and
the other end, extending into the device body, of the telescopic rod and the transmission gear set together form a rack-and-pinion mechanism.

8. The duplex washing machine with the automatically openable drawer according to claim 7, wherein the motor capable of bidirectional rotation is connected with an end of a conducting wire, an other end of the conducting wire passes through the device body to be connected with a terminal, and
the terminal is connected with a control system of the washing machine to receive a signal that triggers the motor to rotate clockwise or counterclockwise, and to push or pull the drawer.

9. The duplex washing machine with the automatically openable drawer according to claim 1, wherein the horizontal bracket is a plate structure horizontally arranged, two ends of the plate structure are horizontal fixing parts that are fixedly connected to the fixing base plates on corresponding sides, a middle part of the plate structure is a horizontal mounting part on which the device body is mounted, and two ends of the horizontal mounting part are correspondingly connected to the horizontal fixing parts through oblique parts that extend downwards obliquely.

10. The duplex washing machine with the automatically openable drawer according to claim 9, wherein
the horizontal fixing parts are correspondingly placed on the fixing base plates and fixedly connected with the fixing base plates, and the device body is fixedly mounted on an upper side of the horizontal mounting part.

11. The duplex washing machine with the automatically openable drawer according to claim 3, wherein a fixing member is fixedly mounted on the rear end surface of the protruding part, an insertion hole for allowing the extension end of the telescopic rod to be inserted is formed in the fixing member, and
a stop rib that protrudes in a radial direction and that is larger than a diameter of the insertion hole is arranged at the extension end of the telescopic rod, and the stop rib is clamped between the fixing member and the protruding part, so that the extension end of the telescopic rod is fixed with the front panel of the drawer.

12. The duplex washing machine with the automatically openable drawer according to claim 3, wherein the telescopic rod extends in the pushing-pulling direction of the drawer, and the extension end of the telescopic rod is connected with a middle part of the protruding part.

13. The duplex washing machine with the automatically openable drawer according to claim 4, wherein the device body is mounted in a middle of the horizontal mounting part so that the drawer is stressed uniformly when the automatic ejection device drives the drawer to move out of the housing.

14. The duplex washing machine with the automatically openable drawer according to claim 4, wherein each of the fastening bolts is sleeved with a rubber cushion, and the rubber cushion is clamped between the device body and the horizontal bracket.

* * * * *